Oct. 21, 1952     T. J. HOUSE     2,614,660
COVERED SPRING GREASING DEVICE
Filed June 27, 1947
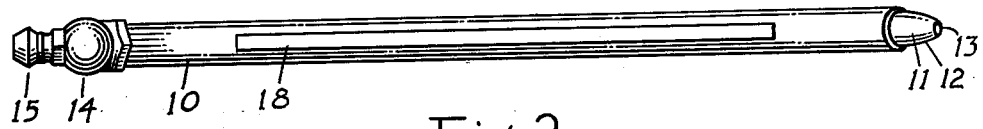
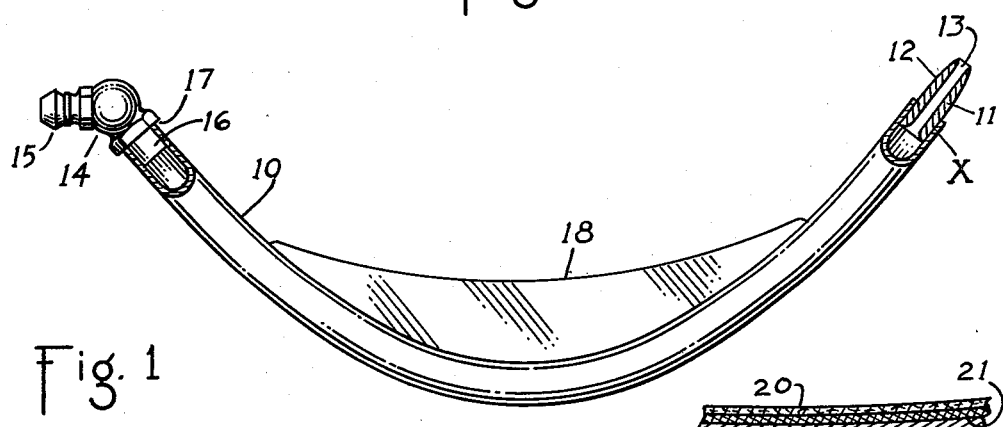
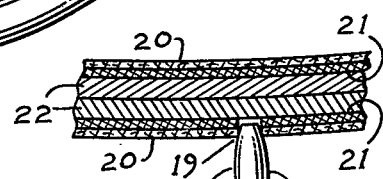
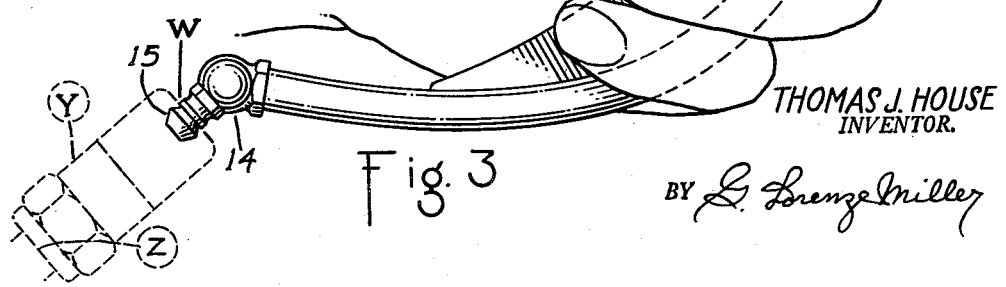
THOMAS J. HOUSE
INVENTOR.
BY G. Lorenze Miller Patented Oct. 21, 1952

2,614,660

UNITED STATES PATENT OFFICE 2,614,660

COVERED SPRING GREASING DEVICE

Thomas J. House, Decatur, Ill.

Application June 27, 1947, Serial No. 757,442

2 Claims. (Cl. 184—1)

The present invention relates to new and useful improvements in accessories for grease guns, and has for its primary object to provide in a manner as hereinafter described and illustrated in the accompanying drawings, a device of this character embodying novel means for facilitating the ready and easy lubrication of covered springs on motor vehicles of various types.

In actual operation the muzzle of grease guns of the usual type is necessarily affixed to the spring of a vehicle being lubricated, by means of various clamp devices, and usually by one resembling the well known C clamp. By such procedure approximately 10 minutes of time is required for each point of lubrication, that is to say, for each aperture for lubrication provided in the spring covering. Now, by comparison, in using my invention, no clamps or any other means for fixed attachment are required, as the operator simply holds my device—which is slipped over the fore part of the usual grease gun—in a position to enable its tapered snout to be inserted into the lubricating hole in the spring covering, which action consumes an average of 30 seconds of time per each point of lubrication served.

Accordingly, the present invention has for its primary object the saving of a relatively considerable amount of time consumed for the lubrication of covered springs on motor vehicles.

Another object of the invention, of equal importance with that of the saving of time for the operator, is the saving of operator fatigue heretofore caused by the handling, affixing and detaching of various fittings and attachments in grease guns of the usual type.

A further object is to provide in a device of the character herein set forth, such durable, simple, and economical structure as renders it readily and practically adaptable to modern production methods of manufacture, and which imparts a neat and workmanlike appearance to the whole, while at the same time providing an improved device of this character which will insure its safe, rapid interconnection with a grease gun, but which may be instantly disconnected without the use of tools of any kind.

In the drawings:

Fig. 1 is a side elevational view, a portion of each end shown in section to facilitate a clear illustration of the assembly.

Fig. 2 is a top plan view of Fig. 1, and,

Fig. 3 is a general side view of the device showing the manner of its use in the hand of the operator, a fragmentary section of the covered spring indicating how the snout of the device is inserted into a lubricating aperture in the covering of the spring, while the dotted lines in the lower left-hand corner of the view indicate a type of grease gun fitting into which the present invention is snap-fitted for practical use.

Referring to the drawings in detail, the Fig. 1 shows the tube 10 preferably made from metal —copper, for example—formed to provide both a practical means of application for the purpose intended, and an easy and convenient hand-hold for the operator. The snout 11 is fixedly mounted in one end of the tube 10 as at X. The somewhat tapered, curved outer surface 12 of the snout 11 provides ready and convenient adaptability to lubricating apertures of various sizes in the spring coverings of motor vehicles, and the longitudinally, centrally disposed through opening 13 is the outlet for the grease injected into the spring cover by means of the usual grease gun, which is not here shown. The adapter fitting, however—shown by the dotted lines at Y— provides the means for interconnection between my invention and the grease gun, said adapter fitting being normally threadably connected to the foreward end of the grease gun as at Z and is adapted for connection with the body by simply snap-fitting the nozzle 15 of said body 14 into the adapter fitting as at W, said adapter fitting having within and adjacent its outer end (at W) an arrangement of parts comprising means for removably though firmly engaging the nozzle 15 above referred to, although these parts within the adapter fitting are not shown, as they are no part of this device and may be comprised in any suitable arrangement for the purpose.

Said body 14 has the hollow neck portion 16 (see Fig. 1), which serves to integrally mount the body 14 in the end of the tube 10, which, in turn, abuts the shoulder 17 of the body, and it will be obvious to those skilled in the art that grease injected by and from a grease gun will course through said body 14, through the tube 10, out through the snout 11 and into the spring cover as hereinbefore set forth.

The web 18 preferably made from metal, is fixedly mounted by solder or other suitable means, in the curve of the tube 10 to impart strength and rigidity to said tube and to maintain its shape without distortion, from use.

Referring to Fig. 3, the invention is shown in a practical application to its purpose, the hand of the operator holding the device in a position to effect the discharge of grease through a lubricating aperture 19 in the outer cover 20 and the inner padding 21, to the spring leaves 22.

From the foregoing it will be observed that I have provided a novel, yet simple structure for use with a grease gun or the like and interconnecting means, which are adapted and arranged whereby the device is yieldably supported by the hand of the operator and whereby the device is instantly removable from contact with the mechanism to which is applied for the purpose of lubricating said mechanism.

I am aware that various changes may be made in the form of the invention without departing from the essential character thereof, and I prefer therefore, to be subject to the limits of the appended claims and not to the description setting forth the preferred form of the invention.

I claim:

1. In a spring greasing appliance, the combination of a curved tube, said curved tube having a fitting for connecting said curved tube to a source of grease and a tapered snout on one end to engage an opening in a spring cover so that a lubricant can be forced from the source of grease into the spring cover through the curved tube, said curved tube having a reinforcing integral web, said web being on the outside and in the curve of the tube but removed from the end of the tube, to facilitate the holding or handling of the appliance and strengthening the curved tube.

2. In a spring greasing appliance, the combination of a curved tube of uniform diameter, said curved tube having a fitting for connecting said curved tube to a source of grease and a reduced tapered snout on one end to engage an opening in a spring cover so that a lubricant can be forced from the source of grease into the spring cover through the curved tube, said curved tube having a reinforcing integral web, said web being on the outside and in the curve of the tube but removed from the fitting to the source of grease and the reduced tapered snout, to facilitate the holding or handling of the appliance and strengthening the curved tube.

THOMAS J. HOUSE.

REFERENCES CITED

The following references are of record in the file of this patent:

UNITED STATES PATENTS

| Number | Name | Date |
|---|---|---|
| 1,192,922 | Manning | Aug. 1, 1916 |
| 1,419,210 | Bradford | June 13, 1922 |
| 2,130,009 | Hazelip | Sept. 13, 1938 |